United States Patent

Fried

[15] 3,686,728

[45] Aug. 29, 1972

[54] METAL CUTTING TOOL

[72] Inventor: Joseph William Fried, 4619 Nagel Ave., Sherman Oaks, Calif. 91403

[22] Filed: Aug. 10, 1970

[21] Appl. No.: 62,427

[52] U.S. Cl. ........................................29/96, 29/105
[51] Int. Cl. ..........................B26d 1/00, B26d 1/12
[58] Field of Search............29/96, 97, 98, 105, 105.1

[56] References Cited

UNITED STATES PATENTS

| | | | |
|---|---|---|---|
| 1,460,030 | 6/1923 | Mattson | 29/105 |
| 2,415,136 | 2/1947 | Jerome | 29/105 |
| 3,189,976 | 6/1965 | Pickril | 29/96 |
| 3,276,101 | 10/1966 | Plein | 29/105 |
| 3,298,107 | 1/1967 | Bergstrom | 29/105 |
| 3,330,020 | 7/1967 | Fox | 29/98 |
| 3,363,299 | 1/1968 | Gowanlock | 29/105 |
| 3,468,401 | 12/1969 | Kelm | 29/96 |
| 3,498,164 | 3/1970 | Miko et al. | 29/96 X |
| 3,516,134 | 6/1970 | Heuser | 29/105 |
| 3,542,528 | 11/1970 | Bech | 29/105 X |

*Primary Examiner*—Harrison L. Hinson
*Attorney*—Allan D. Mockabee

[57] ABSTRACT

A rotary cutting tool comprising a cutter holder movable on a rotary body to hold a cutter parallel to, or at an angle to the axis of rotation including micrometer adjustment means for moving the cutter and cutter holder within precise limits, spacer blocks, parallel faced or tapered for interposition between the adjustment means and the cutter holder to increase the limit of cutter adjustment, the blocks being calibrated in correlation with the micrometer adjustment, the cutter being adjustable and secure-able to positions parallel to or at an angle to the axis of rotation independently of the adjustment means.

11 Claims, 12 Drawing Figures

PATENTED AUG 29 1972
3,686,728
SHEET 1 OF 2
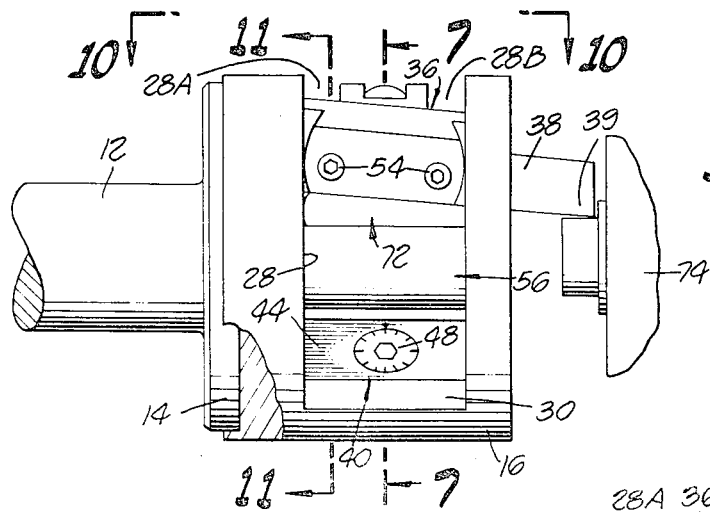
FIG. 1.
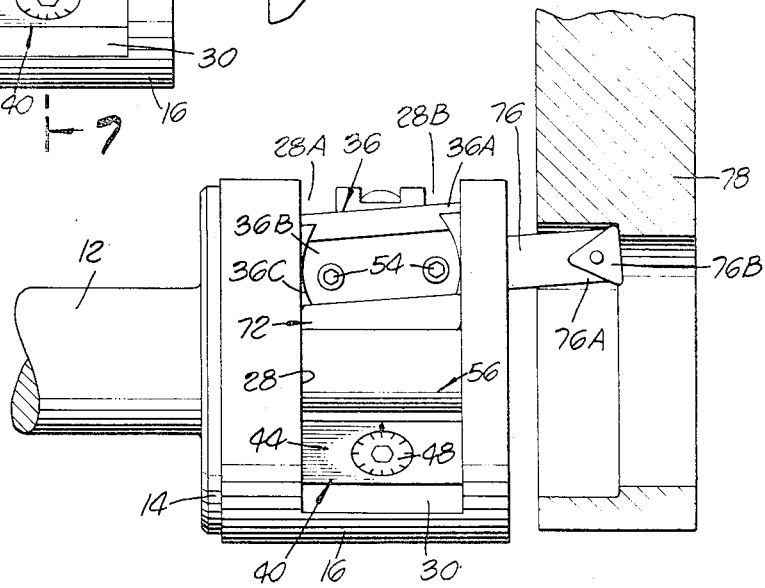
FIG. 2.
FIG. 3.
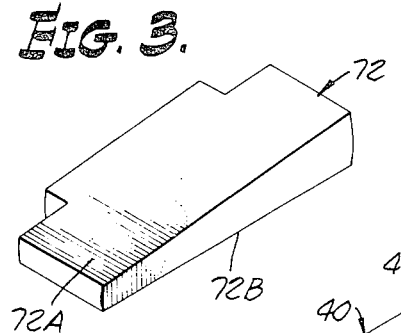
FIG. 4.
FIG. 5.
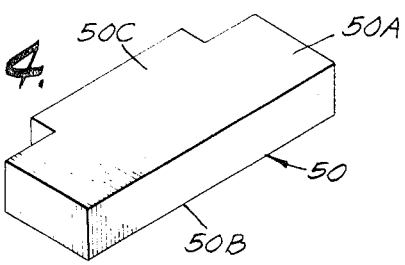
FIG. 6.
INVENTOR.
JOSEPH W. FRIED
BY
Allant Hockabee
ATTORNEY

INVENTOR.
JOSEPH W. FRIED

BY

ATTORNEY

METAL CUTTING TOOL

This invention relates to a rotary cutting tool. While it is of particular advantage in performing accurate and dependable cuts when used in a machine wherein the tool is rotated, and may be considered a rotary cutting tool, it of course also is adaptable for use on machines such as turret lathes, automatic screw machines, and the like, wherein the tool is stationary and the work-piece is rotated.

An object of the invention is to provide a cutting tool (which in this context includes the entire tool holding assembly) wherein one or more cutters can be adjustably positioned radially with respect to the centerline of the tool assembly and parallel thereto in the preferred embodiment; or angularly positioned with respect to the centerline and the cutter securely locked by means accommodating itself to the variable positioning aspects incident to the above mentioned parallel and angular positions of the cutter. As to the angular positioning, the cutter can be positioned so that the angle of the cutter shank to the centerline or rotational axis of the tool is divergent with the working end of the cutter describing an enlarged diameter and can be herein considered a "plus" angle. The cutter can be positioned at an angle wherein the longitudinal axis of its shank is at a convergent angle to the axis of rotation with the working end of the cutter describing a reduced diameter, this angle being termed herein a "minus" angle.

Another object of the invention is to provide a cutting tool assembly which has a range of cutter adjustment radially from or body up to the major diameter of the body, or even beyond those limits.

Another object is to provide a cutting tool assembly adjustable as described above, wherein the cutter tip can be maintained as a close-coupled minimum extension beyond the supporting spindle of the tool.

A further object is to provide for adjustably elevating the cutter relative to the body centerline by an adjustment means comprised of a support platform capable of moving in a prescribed plane, and with said platform having micrometer calibrated means for precise adjustment.

Another object is to provide a tool of the type described with a cutter holder movable in cooperation with the cutter relative to the body in response to the adjustment means. Said cutter holder having engaging means within a cooperating slot of the body so as to be elevatable within the body and being also rotatably accommodating to any established angular disposition of the cutter. Said cutter holder provides means for locking the cutter at established settings.

Another object is to provide for extending the limit of platform movement range by providing for insertion of one or more parallel spacer blocks interposed between the support platform and the cooperating base of the cutter. The thickness of such spacer blocks being multiples or sub-divisions to the range of movement provided by the micrometer adjustment means.

Another object is to provide for positioning the cutter at a precise angle to the centerline of the body by means of a spacer wedge of the required angle being interposed between the platform of the adjustable elevating means and the cooperating base of the cutter.

Another object is to provide that both parallel spacers and angular wedges be engaged and guided within the body so as to be radially elevatable and axially restrained and to be rotatably accommodating to any angular disposition.

The above and other objects and advantages of the invention will more fully appear from the following description in connection with the accompanying drawings:

FIG. 1 is a side elevational view, with a portion in section of an embodiment of the invention showing it and its relationship to a work-piece, a detail of which is shown;

FIG. 2 is a side elevational view showing the cutter at an angle opposite to that of FIG. 1 and showing it performing a different operation in connection with a work-piece shown in section;

FIG. 3 is a perspective view of a spacer block for angularly positioning the cutter and cutter holder;

FIG. 4 is an elevating spacer block with parallel working sides as distinguished from the tapered block of FIG. 3;

FIG. 5 is a perspective view of the cutter holder adjustment means;

FIG. 6 is a perspective view of the cutter holder;

Figure 7:
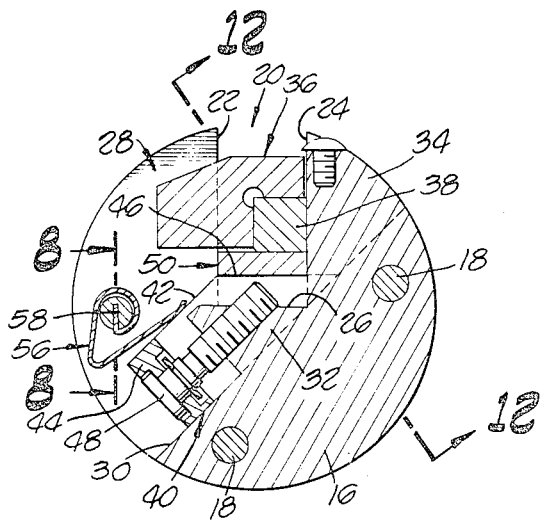
FIG. 7 is a transverse sectional view taken approximately on the line 7—7 of FIG. 1.

The tool assembly includes a spindle 12 which is adapted to be held in a chuck or other tool holder for rotation, although as stated above, the tool can be used in other machines and held stationary while the work is rotated. At the end of the spindle 12 is a flange 14 to which a generally circular tool body 16 is secured by suitable bolts 18.

The tool body 16 is provided with a longitudinal guide channel 20 which is preferably, but not necessarily, parallel to the rotational axis of the spindle 12 and body 16. This channel has side walls 22 and 24 and from its bottom 26 preferably extends radially outwardly to the circular periphery of the body.

Figure 10:
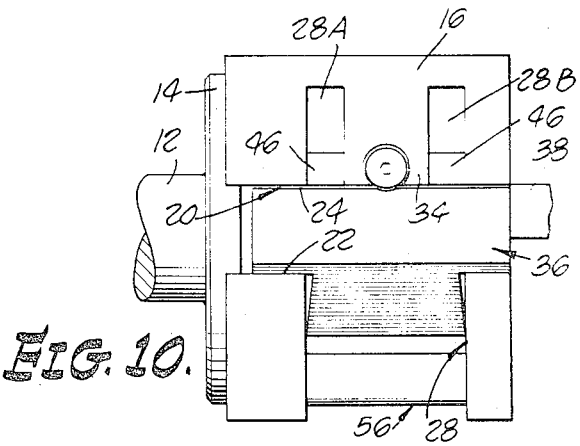
FIG. 10 is a side elevational view of the tool taken on line 10—10 of FIG. 1.
Figure 11:
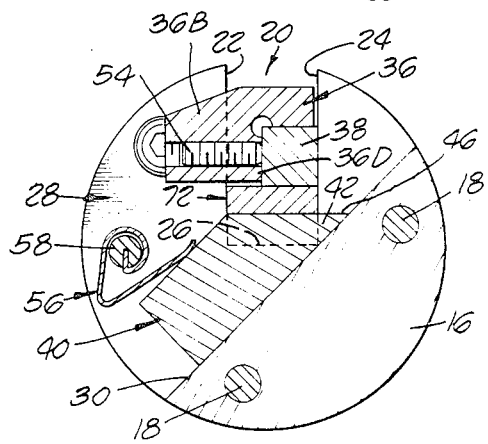
FIG. 11 is a sectional view taken approximately on the line 11—11 of FIG. 1.
Figure 12:
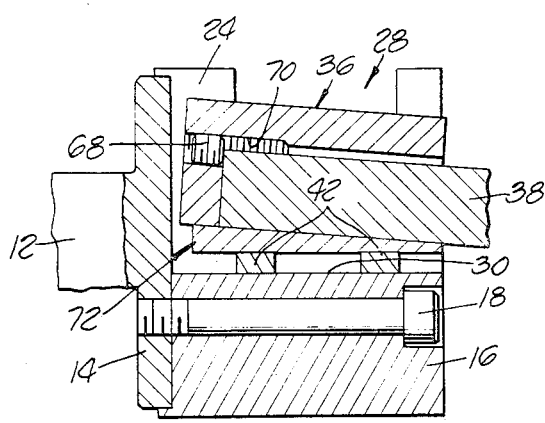
FIG. 12 is a sectional view taken on the line 12—12 of FIG. 7.

Extending transversely of the body, and intersecting the guide channel 20 is a guide slot 28 whose bottom 30 is at an angle to the side walls 22 and 24 of the channel 20, as shown in FIGS. 7 and 10. Portions 32 and 34 of the body 11 project into the slot 28, as shown in FIG. 7, and divide the slot into spaced slot extensions 28A and 28B, as shown in FIGS. 1, 2 and 10.

The channel 20 is adapted to receive a cross-sectionally L-shaped cutter holder 36 and a cutter shank 38 having a cutter tip 39. In the transverse slot 28 is positioned a platform or cutter adjustment means 40 which is illustrated separately in FIG. 5. It includes a pair of parallel spaced arms 42 and a rear connecting cross member 44. The cross member 44 is movable in the wider portion of the transverse slot 28 to the left of the angular body projection 32, as viewed in FIG. 7.

The spaced arms 42 at their forward ends are tapered as at 46 and they are slidable in the slot extensions 28A and 28B at either side of the body projections 32 and 34. A screw 48 is rotatably carried by the transverse portion 44 of the adjustment member 40 and is threaded through the angular body projection 32, so that when the screw is rotated, it will move the adjustment member 40 radially inwardly and outwardly to provide an adjustable backing or platform support for the cutter holder 36. In FIG. 7 a spacer block 50 is shown interposed between the bottom of a cutter shank 52 in the cutter holder and the slanted or tapered ends 46 of the adjustment element 40. When the adjustment element 40 is moved inwardly by the screw 48, the inclined plane provided by the tapered portions 46 will push the spacer block 50, cutter 38 and cutter holder 36 radially outwardly.

The cutter holder 36 is provided with an elongated portion 36A which extends lengthwise of the channel 20 and relatively closely fits the side walls 22 and 24 thereof. Intermediate the ends of the longitudinal portion 36A of the cutter holder, is a transverse projection 36B which lies in the transverse slot 28. As shown, the ends 36C of the lateral projection 36B is a cylindrical segment so that the cutter holder 36 can be angularly tilted with respect to the transverse slot 28.

To secure the cutter 38 in position, I provide cutter holder 36 with set screws 54 which are threaded through the lateral extension 36B, through the cutter engaging face 36D of the cutter holder, so that the set screw will bear against the cutter and tightly hold the opposite face of the cutter against the wall 24 of the longitudinal channel 20. Pressure in the opposite direction produced by the set screws 54 is between the wall 22 of the channel 20 and the adjacent vertical face of the cutter holder 36. The tool setter normally applies thumb pressure against the outer face of cutter holder 36 when locking the screws 54.

Figure 8:
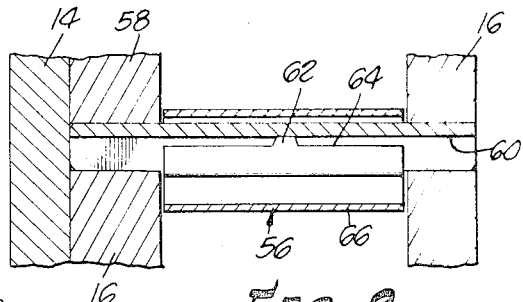
FIG. 8 is an enlarged sectional detail taken approximately on the line 8—8 of FIG. 7.
Figure 9:
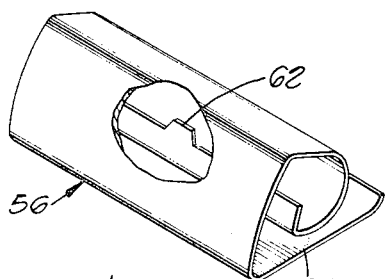
FIG. 9 is a perspective view of a pressure balancing spring with a portion broken away to show the interior structure.

To keep the cutter adjusting element 40 properly seated in the transverse slot 28, I provide a spring element 56 which is mounted upon a channeled post 58 which is mounted in opposite side walls of the transverse slot 28. In FIG. 8 the post is shown provided with a channel 60. The spring element 56 is coiled to loop around the post 58 and the inner end of the spring 56 is provided with a central lug 62 which sets in the bottom of the channel 60 keeping the remaining end edge portion 64 in spaced relation to the bottom of the channel. The outer end portion of the spring 56 is provided with a flat 66 which is adapted to bridge and yieldably bear upon the upper edges of the spaced arms 42 of the cutter holder adjustment member 40. By reason of the one-point engagement of the center lug 62 at the inner end of the spring, and the two-point bridging contact of the outer end of the spring, there is a balanced spring pressure on the adjustment member 40 to keep it in proper position on the bottom 30 of the transverse slot 28. This feature is quite helpful in holding the adjustment member 40 in place when cutters are being changed and when the cutter holder set screws 54 have not been tightened.

The cutter holder 36 is provided with a set screw 68 in a threaded bore 70, the set screw serving to limit inward movement of the shank of the cutter 52 when it is mounted in the tool.

The spacer block 50 was mentioned above. It is shown in FIG. 4 with parallel faces 50A and 50B which are adapted to space the cutter holder 36 outwardly a greater distance than provided by the adjustment member 40 acting alone. The spacer block is provided with a cylindrically formed lateral offset 50C which is adapted to lie in the transverse slot 28 to prevent it from shifting axially, but permitting angular tilting in the same manner as the transverse extension 36B of the cutter holder.

In FIG. 3 there is shown a spacer block 72 having working faces 72A and 72B which are at an angle to each other so that the cutter 38 and cutter holder 36 can be solidly supported by the adjustment member 40 at an angle as shown in FIGS. 1 and 2. In FIG. 1 the spacer block 72 has its working faces convergent toward the work 74. However, in FIG. 2 with the spacer block reversed in position longitudinally of the took shank, the cutter holder 36 and the cutter 76 are held at a divergent angle to the work 78. The angle of FIG. 1, I prefer to call a "minus" angle and the angle of FIG. 2 a "plus" angle.

In FIG. 1, the cutter 38 is illustrated as representative of a solid cutting tool material, such as a "high speed" steel tool bit. In FIG. 3, an alternate type of cutter 76 is illustrated as comprising a steel shank 76A and a brazed-on, or mechanically attached, cutter tip 76B of a differing material, such as carbide or ceramic. Both are basic types of cutters in common industry employment. They may be considered interchangeably employable with this rotary tool.

From the foregoing, it will be seen that I have provided a highly efficient and versatile cutting tool assembly which is capable of quite considerable manipulation to adjust it for different sizes and types of cuts. It is a fairly simple, compact tool suitable to low cost manufacture and pricing so that in addition to providing a versatility and quick adjustment capability to short run work, it is also economically feasible for the higher volume manufacturers to employ numerous such tools preset and available for each re-run of a production lot.

The tool may also be offered in an even lower cost more simplified form where a critical variable adjustment of cutter is not required. In this latter embodiment, the adjustment means are deleted. The tool setter will thus position the cutter in elevation and/or angle by alternate means at his disposal or employ spacer blocks pre-finished to a specific height for a given application. The cutter 38 is then locked by means of the cooperating cutter holder 36 against body channel 20 as in the manner previously described. It is to be recognized, that in most applications, the cutter holder locking means are sufficient to hold the cutter securely without requiring a supplemental platform support from beneath.

It will of course be understood that various changes can be made in the form, details, arrangement and proportions of the various parts without departing from the spirit of the invention.

I claim:

1. A cutting tool having a rotary body with a rotational axis, a cutter holder and a cutter, wherein the improvement comprises: said rotary body including a cutter holder guide channel relative to which the cutter holder and cutter are movable to selected positions with respect to the rotational axis of the body, said cutter holder having a portion lying in said channel and having clamping engagement with a portion of said cutter in said channel, means carried by said cutter holder to force a surface of the cutter into pressurized engagement with the wall of the channel, and, in opposition thereto, respective engagement of the associated cutter holder and the opposite wall of the channel.

2. The structure in claim 1, and said cutter holder guide channel having a longitudinal axis extending longitudinally of the rotational axis of the body, said body having a transverse slot intersecting said channel, and said cutter holder having an elongated portion lying in said channel and having a laterally offset portion lying in said transverse slot and retaining the cutter holder and cutter against movement axially of said body.

3. The structure in claim 2, and said cutter holder and cutter being radially positionable in said channel with respect to the axis of rotation of said body, said cutter holder and cutter having portions lying within said channel and said cutter holder having an offset portion within said transverse slot.

4. The structure in claim 2, and said transverse slot having parallel side wall surfaces, the laterally offset portion of said cutter holder lying in said transverse slot presenting cylindrical surfaces having a common axis and engageable between the parallel wall surfaces of said slot, and said cutter holder being angularly positionable about said common axis.

5. The structure in claim 2, and adjustment means carried by the cutter holder to selectively position the cutter longitudinally with respect to the surfaces of clamping engagement between the cutter holder and the cutter.

6. The structure in claim 2, and said cutter holder being longitudinally and laterally engaged in said guide channel and bridging said transverse slot, the cutter holder including a guideway receptacle for the cutter defined by walls having mutually engageable surfaces with the cutter, the cutter having screw means for jointly urging the cutter against an adjacent wall of said guide channel and for urging portions of said cutter holder which bridge said slot against segments of the opposite wall of said channel.

7. The structure in claim 4, and at least one spacer block in said guideslot between the cutter and cutter holder on the one side and the bottom of said guide slot on the other side and bridging said transverse slot to vary the working limit of guide channel depth, said spacer block having a retaining lateral offset whose ends lie closely adjacent the walls of said slot, the ends of said lateral offset being cylindrically formed to permit angular positioning of the spacer block as a unit with said cutter holder.

8. A cutting tool having a rotary body with a rotational axis and a cutter having at least one flat wall surface, wherein the improvement comprises: said body having a guide channel relative to which the cutter holder is radially adjustable, said rotary body having a support platform carried thereby and movable relative thereto for adjustably limiting the workable depth of said guide channel, said platform being adjustable on a plane which is both lateral to the guide channel and angular to the walls of said guide channel, said support platform having a cutter-engaging surface parallel to said flat surface of said cutter.

9. The structure in claim 8, and said platform having parallel spaced arms slidable in spaced paths in spaced portions of said guide channel, said platform having a bridge connecting the arms thereof at the ends of said arms, the overall movement range of said platform being approximately that of the lengths of said arms from said connecting bridge, a portion of the material of said body between said spaced arms comprising a cutter supporting portion of one of the parallel walls of said channel.

10. The structure in claim 8, and said platform being adjustably positioned jointly by said arms in said paths, and screw means carried by the platform intermediate of said arms threadedly engaging said body, and equalizing spring means interposed between a portion of said body and said spaced arms to yieldably maintain the spaced arms in their respective positions.

11. The structure in claim 1, and said cutter holder guide channel having a bottom and a top, and said cutter holder being capable of unrestricted positional movement from the bottom to the top of said guide channel and toward and away from the rotational axis of said body.

* * * * *